United States Patent

Bernin

[15] 3,638,221

[45] Jan. 25, 1972

[54] SOLID-STATE KEYBOARD

[72] Inventor: Victor M. Bernin, Mount Prospect, Ill.

[73] Assignee: Illinois Tool Works Inc., Chicago, Ill.

[22] Filed: Nov. 24, 1969

[21] Appl. No.: 879,220

[52] U.S. Cl. ..........340/365

[51] Int. Cl. ..........H03k 17/02

[58] Field of Search ..........340/365, 345; 179/84, 90 K; 335/84, 85

[56] References Cited

UNITED STATES PATENTS

| | | | |
|---|---|---|---|
| 3,035,253 | 5/1962 | Devol | 340/365 X |
| 3,119,996 | 1/1964 | Comstock | 340/365 X |
| 3,160,875 | 12/1964 | Bernard | 340/365 X |
| 3,495,236 | 2/1970 | Mathamel | 340/347 |

*Primary Examiner*—Richard Murray
*Attorney*—Robert W. Beart, Michael Kovac, Barry L. Clark and Jack R. Halvorsen

[57] ABSTRACT

The disclosure describes solid-state keyboards employing a saturable magnetic core switch for each key. Each key has a keystem of magnetic material, the keystem having legs extending on opposing sides of the core. Two permanent magnets are attached to the keystem. When a key is not depressed, the magnets are located adjacent opposing sides of the core so that a flux path is formed through the core, the keystem, and the two magnets, to thereby saturate the core. When a key is depressed, the permanent magnets are moved away from the core so that it becomes unsaturated. The core is threaded by one or more windings, at least one of them being excited from an AC drive source. The core and its winding or windings may act as a transformer or variable inductance. Depending upon the wiring configuration employed, a single output signal or a coded combination of output signals may be obtained when a key is actuated.

9 Claims, 10 Drawing Figures

INVENTOR.
Victor M. Bernin

INVENTOR.
Victor M. Bernin

SOLID-STATE KEYBOARD

DESCRIPTION OF THE PRIOR ART

Keyboards comprise a well known means for feeding information into data processors. Such keyboards may take many forms. One well known type comprises a plurality of electrical switch contacts mechanically operated by depressing a key. These devices suffer many disadvantages in that they are subject to wear, the contacts arc or oxidize and thus become unreliable, and dirt entering the keyboard may prevent proper conduction through the switch contacts.

More recently, solid-state keyboards have been developed which overcome the disadvantages of the type using electrical switch contacts. One form of solid-state keyboard comprises a permanent magnet and a core associated with each key. An AC signal is applied to a winding threading the core. The core and winding constitute a variable inductance. When a key is in the undepressed condition, the permanent magnet is positioned away from the core and the effective impedance is relatively high. When a key is depressed, the permanent magnet saturates the core and the impedance drops to a relatively low value. While this type of keyboard overcomes the disadvantages encountered by electrical switch contacts, it suffers the disadvantage that the keys and cores are not readily replaceable or interchangeable. Furthermore, since the keyboard switches now known employ only a single permanent magnet, considerable key movement is required in order to accomplish the switching function.

SUMMARY

An object of the present invention is to provide a solid-state keyboard switch which may readily be used in any key position on a key board.

An object of this invention is to provide a solid-state keyboard switch employing a magnet core, said switch requiring only a minimum movement of a key to accomplish the switching function.

A further object of the invention is to provide a keyboard switch which may be readily incorporated into a keyboard generating any predetermined output code. The construction of the switch is such that coding is accomplished by the manner in which conductors thread a magnetic core in the switch.

Still another object of the invention is to provide a keyboard switch wherein a magnetic core associated with the switch may function either as a transformer or a variable inductor to accomplish the switching function.

The above-stated and other objects of the invention are accomplished by provision of a keystem, a pair of permanent magnets, and a saturable magnetic core. The keystem forms a generally U-shaped magnetic flux path and the permanent magnets are attached to the legs of the keystem. When the keystem is not depressed, the permanent magnets are adjacent opposite sides of the magnetic core and the core is saturated. When the keystem is depressed, the permanent magnets move away from the core and the core becomes unsaturated. An AC signal source continuously applies a signal to a conductor threading the core.

In a first embodiment, the core acts as a variable inductor that has a high AC impedance when unsaturated. It may be connected in either a bridge circuit or voltage divider network so as to produce an output signal when the keystem is depressed.

In a second embodiment, the core is threaded with a second or sense winding so that it may act as a transformer when the keystem is depressed and the core is unsaturated.

DESCRIPTION OF PREFERRED EMBODIMENTS

Figure 1:
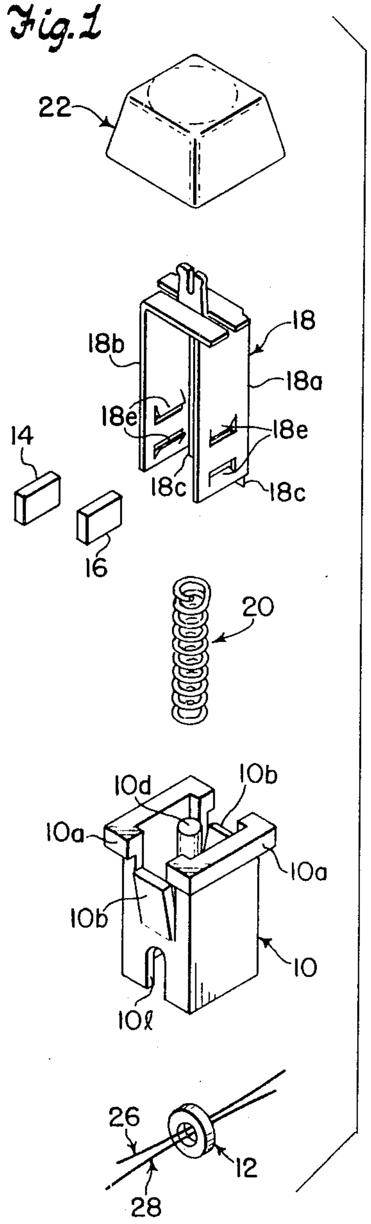
FIG. 1 is an exploded view of a key switch.

FIGS. 1 through 4 illustrate a preferred embodiment of the invention comprising a housing or guide support means 10, a magnetic core 12, first and second permanent magnets 14 and 16, a keystem 18, and a keystem return spring 20. A key cap 22 is attached to the top of the keystem.

Figure 2:
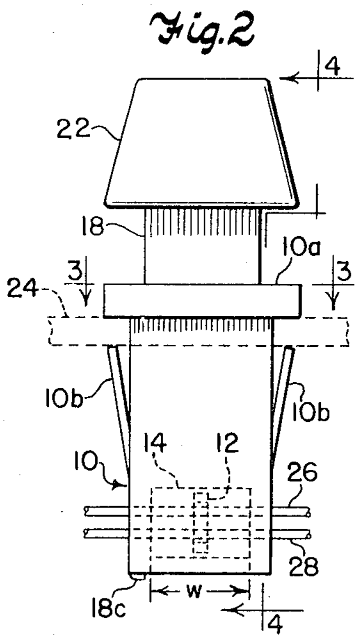
FIG. 2 is a front view of the switch in its normal or undepressed condition.
Figure 3:
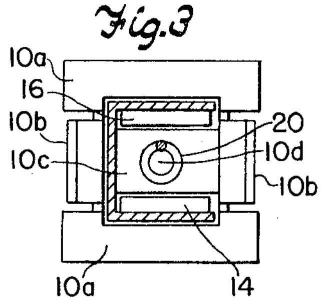
FIG. 3 is a top view taken along the line 3—3 of FIG. 2.

The housing is an elongated body which may be square and need be no wider than the dimensions of the key cap. The housing may be formed of plastic or other nonmagnetic material and, in the disclosed embodiment comprises an integral body formed from a single piece of polycarbonate. The housing may be formed with overhanging ledge portion **10*a* extending partially around its top. A portion of two opposing sides of the housing are formed at an angle to the length of the housing so as to provide two ears 10*b*. The ears 10*b* have a certain degree of resiliency so that the switch housing may be inserted downwardly through a hole in a keyboard support plate 24 as shown in FIG. 2. After the ears pass through the hole they expand outwardly to prevent upward movement of the housing. The ledge 10*a*** prevents downward movement. Thus, the housing may be firmly locked in position in the keyboard plate. If necessary, the housing may be removed from the plate by pressing the ears inwardly and lifting the housing.

The housing has a longitudinal opening 26 for receiving the keystem 18 which, as shown in FIG. 1, is a generally boxlike structure having two legs **18*a* and 18*b*. A central portion 10*c* of the housing extends from one side of the housing to the other thus bisecting the lower portion of the opening 26. A post 10*d* extends upwardly from central portion 10*d* to retain a compression spring which is compressed between portion 10*c*** of the housing and the underside of the top portion of the keystem.

The keystem has a portion of one side **18*d* (FIG. 4) removed so that legs 18*a* and 18*b* may straddle the central portion 10*c* of the housing. Side 18*d* of the keystem is formed with two downwardly extending ears 18*c* as shown in FIG. 1. After the keystem is inserted through the opening in housing 10, the ears are bent outwardly. When so bent, the ears engage the lower edges of the housing 19 and limit upward movement of the keystem in response to the bias exerted on the keystem by the compression spring 20**.

Figure 4:
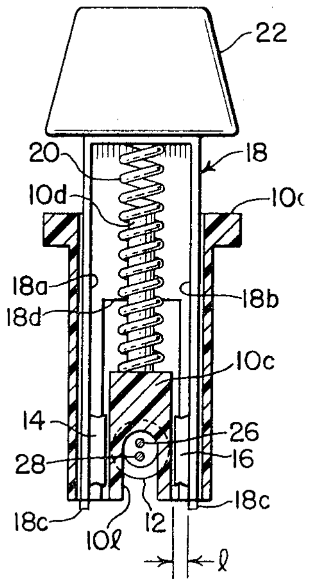
FIG. 4 is a sectional side view taken along the line 4—4 of FIG. 2.

The lower portion of the housing 10 is formed so as to have a recess **10*e* extending across it between opposing sides. A further recess is formed perpendicular to recess 10*e* and extending through the central portion 10*c* of the housing. A ferrite toroidal core 12 is positioned in the further recess so that its center opening is aligned with recess 10*e*. As shown in FIG. 4, this arrangement locates the core 12 so that it may be readily threaded by one or more windings 26 and 28**. The core may be force fit into the recess or else held in place by a suitable adhesive material. The core may be made from ferrite or material exhibiting low magnetic remanence properties.

The legs **18*a* and 18*b* of the keystem are punched and bent inwardly to form four tangs 18*e*. These tangs engage recesses in permanent magnets 14 and 16 to hold the permanent magnets for movement with the keystem. By way of example only, the keystem may be formed from nickel plated steel and the permanent magnets from a barium ferrite filled compound. The magnets 14 and 16 are attached to legs 18*a* and 18*b* so that the south pole of one magnet and the north pole of the other is adjacent the magnet core. Furthermore, as illustrated in FIG. 4, the magnets are mounted on the keystem so as to be directly opposite and closely adjacent core 12 when the key is in its normal or undepressed state. Preferably, the outer diameter of core 12 is slightly less than the width of the portion 10***c* of the housing so that the permanent magnets do not touch the core as they slide along the sides of the portion 10*c*.

Figure 5:
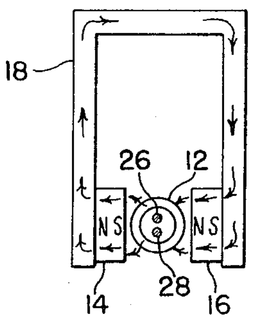
FIG. 5 is a diagram illustrating flux paths when a key is not depressed.
Figure 6:
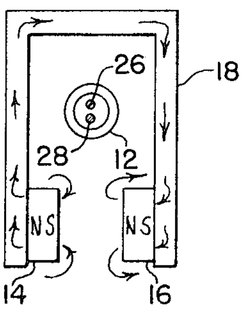
FIG. 6 is a diagram illustrating flux paths when a key is depressed.

FIGS. 5 and 6 illustrate the operation of the switch. When the switch is in the normal or undepressed state as shown in FIG. 5, the permanent magnets are directly opposite and closely adjacent the core 12. A flux path is established from the north pole of magnet 14 through the keystem 18, through magnet 16, and through parallel paths in core 12, back to the south pole of magnet 14. Since the flux takes the path of least resistance, flux in the gap between the magnets will concentrate in the core thereby causing saturation.

When the switch is in the depressed state, the permanent magnets are moved away from core 12 and the core desaturates. The flux paths in this case are generally indicated by the directional arrows of FIG. 6. The core may be used as a transformer or a variable inductor in switching circuits as subsequently described.

It should be noted that the present invention permits use of permanent magnets having dimensions 1 and *w* such that the ratio of $1/_w$ is quite small. For lower ratios of $1/_w$ the rate of change of flux in the airgap between magnets is higher, thus requiring smaller keystem movement in order to accomplish the switching function. For lower ratios of $1/_w$, the maximum flux density is lower but is still sufficient to saturate the core.

Figure 7:
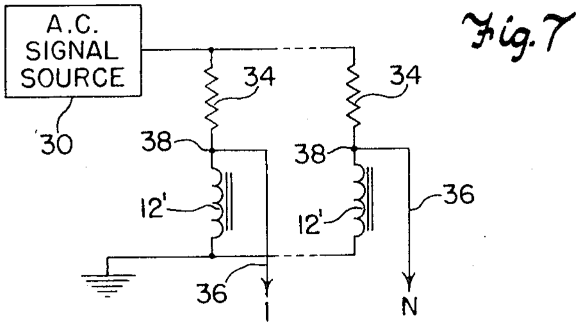
FIG. 7 is a circuit diagram illustrating how the switch may be employed as a variable inductor in a voltage divider arrangement.

FIG. 7 shows a keyboard circuit arrangement incorporating a plurality of keyboard switches connected to function as variable inductors. An AC signal source 30 is connected to ground through a plurality of parallel circuits. There is one circuit for each switch and each circuit includes a resistance 34 or other type of impedance element connected in series with a variable inductor 12′. It will be understood that each inductor 12′ of FIG. 7 corresponds to core 12 previously described with a single winding threading the core. The connection between resistor 34 and ground corresponds to the winding threading the core. An output lead 36 is connected to each series circuit at a point 38 between resistance 34 and inductor 12′.

The circuit of FIG. 7 operates as follows. When no keys are depressed, all cores 12 are saturated so that inductances 12′ provide a low AC impedance. Consequently, the output leads 26 are at a relatively low voltage.

When a key is depressed so that its core 12 is unsaturated, the corresponding inductor 12′ presents a high AC impedance. The point 38 in the corresponding series circuit rises to a higher level and this signal appears on the output lead 36. When the key is released, the core desaturates and the signal on lead 36 returns to its normal level.

Figure 8:
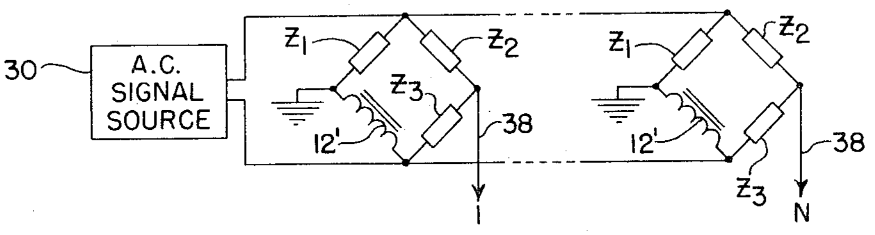
FIG. 8 is a circuit diagram illustrating how the switch may be employed as a variable inductor in a bridge arrangement.

FIG. 8 shows how the key switches of the present invention may be incorporated as variable inductors in a bridge arrangement. There is a bridge circuit for each key switch and each bridge has three impedances $Z_1$, $Z_2$, and $Z_3$. The fourth leg of each bridge includes a variable inductor 12′. One side of the AC signal source 30 is connected to each bridge between $Z_1$ and $Z_2$ and the other side is connected between $Z_3$ and inductor 12′. Each bridge is grounded between $Z_1$ and inductor 12′ and an output lead 38 is connected between $Z_{2\ and\ z3}$.

The circuit of FIG. 8 operates as follows. When no keys are depressed, all cores 12 are saturated so that all impedances 12′ are relatively low. However, the impedances of the bridge circuit are chosen such that the bridges are balanced when the impedances 12′ are at a high value. Therefore, a high-level output signal appears on all of the leads 38.

Assume that the key corresponding to the numeral "1" is depressed. The core 12 desaturates and thus presents a high AC impedance 12′. This balances the bridge circuit for the "1" switch so that the output lead 38 for the "1" switch drops to a low level. Upon release of the "1" key, the bridge again becomes unbalanced and the output lead returns to the high level.

Figure 9:
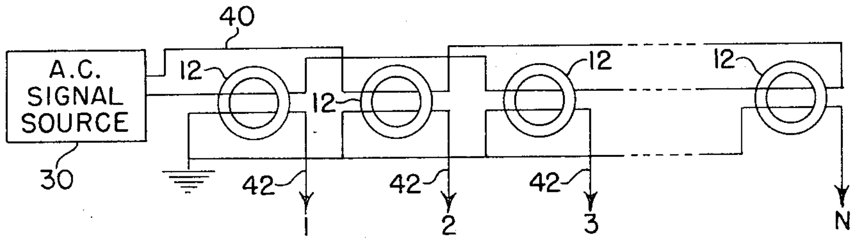
FIG. 9 is a circuit diagram illustrating a noncoded keyboard wherein the switch is employed as a transformer.

FIG. 9 shows a further keyboard circuit arrangement comprising a plurality of switches. In this embodiment, the cores 12 act as transformers. An AC drive winding 40 threads each of a plurality of cores 12, and is connected to an AC signal source 30. Each core is threaded by a sense winding 42 which is connected to ground or common circuit at one end.

As long as no keys are depressed, the cores 12 are all saturated and cannot function as transformers. Upon depression of any key, the core corresponding to that key desatureates. The AC signal on the drive winding 40 is coupled to the sense winding 42 so that an AC output signal is produced on the sense winding. When the key is released, the core is again saturated so that the AC drive signal is not coupled to the sensing winding.

Figure 10:
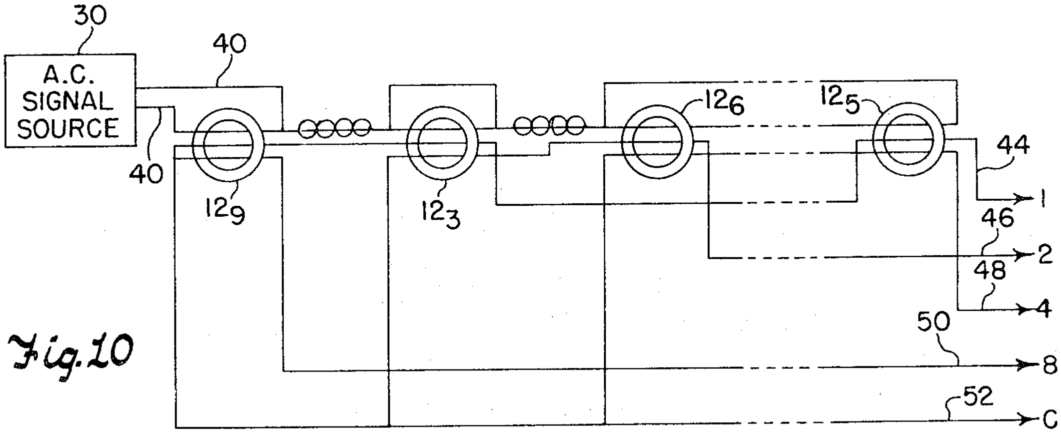
FIG. 10 is a circuit diagram illustrating a coded keyboard wherein the switch is employed as a transformer.

The circuit of FIG. 9 illustrates a nonencoded keyboard circuit. That is, when a key is depressed an AC signal appears on only one sense winding 42, that sense winding corresponding to the depressed key. FIG. 10 illustrates how the present invention may be incorporated in a keyboard giving binary coded decimal output signals representing the key depressed.

The embodiment of FIG. 10 comprises a plurality of cores 12, there being one core for each key on the keyboard. Each core reference numeral includes a subscript corresponding to the numeric value assigned to that key. A drive winding 40 threads each of the cores and is connected to an AC signal source 30. One or more sense windings 44, 46 and 48 and 50 are selectively threaded through the cores. The number of sense windings varies depending upon the type of code employed. For purposes of illustration only, it is assumed that the partial circuit of FIG. 10 produces a numeric binary coded decimal output, hence four sense windings are required. The sense windings are connected at one end to a common lead 52.

As long as no keys are depressed, all cores 12 are saturated so that the AC signal on drive winding 40 is not coupled to any sense windings. When a key, such as the numeral "3" key, is depressed, the permanent magnets (FIG. 4) associated with the "3" key, are moved downwardly away from core $\mathbf{12_3}$ and the core desaturates. The core $\mathbf{12_3}$ then functions as a transformer so that the AC signal on drive winding 40 induces AC signals on sense windings 44 and 46. Signals occurring simultaneously on windings 44 and 46 represent the numerical three in binary coded decimal notation. When the "3" key is released, the core $\mathbf{12_3}$ is again saturated by the permanent magnets and the signals on windings 44 and 46 terminate.

As a further example, assume that the "9" key is depressed. In this case the permanent magnets are moved out of their saturating position adjacent core $\mathbf{12_9}$. The core $\mathbf{12_9}$ desatureates and acts as a transformer so that the AC signal on drive winding 40 induces AC signals on sense windings 44 and 50. Signals occurring concurrently on Windings 44 and 50 represent the numeral nine in binary coded decimal notation.

It will be understood that the number of sense windings will depend upon the particular code output which it is desired to obtain from the keyboard. Generally speaking, there should be a sense winding for each place or order in the desired code. The number of sense windings threading a particular core is dependent upon the value represented by the key corresponding to that core, and upon the particular code employed, For example, in either a straight binary or a straight binary coded decimal keyboard, the core for the "2" key would be threaded by only one sense winding since the value two in either of these codes is represented by 0010. On the other hand, for the excess—three binary coded decimal code the "2" key would be threaded by two sense windings since the value two in this code is represented by 0101.

As shown in FIG. 10, the outward return legs of the drive winding are twisted together between cores so that the electromagnetic fields generated by the AC signal on the drive winding cancel in space. This reduces the cross coupling between the drive and sense winding in the regions between cores where, because of the close spacing between windings, there might otherwise be a residual pickup of the AC signal in the sense windings.

FIG. 9 illustrates another drive winding arrangement which may advantageously be used in the circuit of FIG. 10 for achieving signal cancellation. In this arrangement, one drive winding threads alternate cores in one direction and threads the remaining cores in the opposite direction. The fields produced by the two legs of the drive winding cancel in space thus reducing cross coupling between the drive and sense windings.

The signal cancellation arrangement of FIG. 9 has a distinct advantage in that sense windings may thread through all the cores in the same direction. This simplifies the wiring procedure and reduces manufacturing costs.

In summary, the present invention provides a novel keyboard switch which, because of its unique construction, is simple and reliable The construction of the switch simplifies the wiring procedure necessary to incorporate a plurality of the switches into a keyboard with either a coded or a non-coded output. The switch may be used as either a transformer or a variable inductor. It may be used in a keyboard producing an output in any one of various codes and the coding may be changed merely by changing the sense windings.

While preferred embodiments of the invention have been shown and described, it will be understood that various substitutions and modifications may be made without departing from the spirit and scope of the invention as defined by the appended claims. For example, toroidal cores have been shown but cores of other shapes, preferably closed path, may be used. Furthermore, the core need not be disposed in a vertical plane but may be inclined or disposed in a horizontal plane even though this would render the wiring procedure more difficult.

I claim:

1. A keyboard switch comprising a longitudinal housing, a toroidal magnetic core, means mounting said core in said housing so that the axis of said core is substantially perpendicular to the longitudinal axis of said housing, a pair of wafer-like permanent magnets, a keystem carried in said housing for reciprocating movement along the longitudinal axis of said housing, said keystem being formed to have a pair of spaced-apart legs, each of said magnets mounted on one of said legs, said legs and magnets being arranged so that the opposed faces of said magnets are positioned in planes substantially parallel to the longitudinal axis of said housing and the axis of said core, said legs and magnets being further arranged so that said opposed faces are positioned substantially immediately adjacent to the periphery of said core in one longitudinal position of said keystem relative to said housing.

2. A keyboard switch as defined in claim 1, wherein said magnets are formed to have a width substantially greater than the axial thickness of said core.

3. A keyboard switch as defined in claim 2, biasing means for biasing said keystem in said one longitudinal position, and said magnets being further formed to have a height substantially equal to the diameter of said core.

4. A keyboard switch as defined in claim 3, wherein the north pole of one of said magnets and the south pole of the other of said magnets is disposed adjacent to the periphery of said core.

5. A keyboard switch as defined in claim 4, wherein said magnetic core is made of a material exhibiting low magnetic remanence.

6. A keyboard switch as defined in claim 3, and further comprising a winding threading said core.

7. A keyboard switch as defined in claim 3, and further comprising drive-winding means and sense-winding means threading said core.

8. A keyboard switch as defined in claim 3, and said legs and the portion of said keystem interconnecting said legs being formed of a magnetic material.

9. A keyboard switch as defined in claim 1, wherein said housing is formed to have a recess therein extending from one side of said housing to the other along the axis of said core whereby a winding may be passed through said housing and said core in a substantially straight line.

* * * * *